US010375609B2

(12) United States Patent
Norrman

(10) Patent No.: US 10,375,609 B2
(45) Date of Patent: *Aug. 6, 2019

(54) OPERATION OF A SERVING NODE IN A NETWORK

(71) Applicant: TELEFONAKTIEBOLAGET LM ERICSSON (PUBL), Stockholm (SE)

(72) Inventor: Karl Norrman, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/047,271

(22) Filed: Jul. 27, 2018

(65) Prior Publication Data

US 2018/0359668 A1  Dec. 13, 2018

Related U.S. Application Data

(63) Continuation of application No. 15/600,225, filed on May 19, 2017, now Pat. No. 10,039,036, which is a (Continued)

(51) Int. Cl.
H04W 36/00 (2009.01)
H04L 29/06 (2006.01)
(Continued)

(52) U.S. Cl.
CPC ..... *H04W 36/0083* (2013.01); *H04L 63/1466* (2013.01); *H04L 63/20* (2013.01); (Continued)

(58) Field of Classification Search
CPC ... H04W 36/008; H04W 12/08; H04W 12/12; H04W 36/0038; H04W 40/04; (Continued)

(56) References Cited

U.S. PATENT DOCUMENTS 9,072,014 B2  6/2015  Norrman et al.
9,661,534 B2  5/2017  Norrmann
(Continued)

FOREIGN PATENT DOCUMENTS

CN  102017681 A  4/2011
WO  2009057730 A2  5/2009
WO  2011137805 A1  11/2011

OTHER PUBLICATIONS

Notice of Reasons for Rejection dated Mar. 8, 2016, issued in Japanese Patent Application No. 2014-553632, 8 pages.
(Continued)

*Primary Examiner* — Mark H Rinehart
*Assistant Examiner* — Kenneth P Hunt
(74) *Attorney, Agent, or Firm* — Rothwell, Figg, Ernst & Manbeck, P.C.

(57) ABSTRACT

The invention provides a system and method for repairing corrupt security information. At a serving node in a telecommunications network, security capabilities of a terminal are received when the terminal registers with the serving node. The received security capabilities are stored. A path switch request message is received from a target base station following an X2 handover request sent from a source base station to the target base station for handover of the terminal, the path switch request including the security capabilities of the terminal. The serving node determines whether the security capabilities of the terminal stored in the storage medium should be sent to the target base station. If so, the serving node sends the stored security capabilities of the terminal to the target base station for use in reselecting security algorithms to be used in communications between the target base station and terminal following the handover.

16 Claims, 9 Drawing Sheets

Related U.S. Application Data continuation of application No. 14/374,455, filed as application No. PCT/EP2012/057471 on Apr. 24, 2012, now Pat. No. 9,661,534.

(60) Provisional application No. 61/590,930, filed on Jan. 26, 2012.

(51) Int. Cl.
*H04W 12/08* (2009.01)
*H04W 12/12* (2009.01)
*H04W 40/04* (2009.01)
*H04W 36/08* (2009.01)

(52) U.S. Cl.
CPC ......... *H04L 63/205* (2013.01); *H04W 12/08* (2013.01); *H04W 12/12* (2013.01); *H04W 36/0038* (2013.01); *H04W 40/04* (2013.01); *H04W 36/08* (2013.01)

(58) Field of Classification Search
CPC .............. H04W 36/08; H04W 36/0083; H04L 63/1466; H04L 63/20; H04L 63/205
USPC ........................................................ 370/331
See application file for complete search history.

(56) References Cited

U.S. PATENT DOCUMENTS

| | | | |
|---|---|---|---|
| 10,039,036 B2 * | 7/2018 | Norrman | H04L 63/1466 |
| 2001/0011371 A1 | 8/2001 | Tang | |
| 2010/0130168 A1 | 5/2010 | Mizikovsky | |
| 2010/0227617 A1 | 9/2010 | Jung et al. | |
| 2010/0238903 A1 | 9/2010 | Kitazoe | |
| 2010/0263021 A1 | 10/2010 | Arnott et al. | |
| 2011/0059736 A1 | 3/2011 | Norrman et al. | |
| 2011/0116629 A1 | 5/2011 | Forsberg et al. | |
| 2011/0256855 A1 | 10/2011 | Wang | |
| 2012/0039464 A1 | 2/2012 | Xu et al. | |
| 2012/0066737 A1 | 3/2012 | Zhang et al. | |
| 2013/0128866 A1 | 5/2013 | Zhang et al. | |
| 2013/0308606 A1 | 11/2013 | Xu et al. | |
| 2014/0228003 A1 | 8/2014 | Norrman et al. | |

OTHER PUBLICATIONS

TSG-RAN RAN3 "LS on E-UTRAN security related issues" 3GPP TSG RAN WG3 Meeting #60, R3-082373, 2008, 2 pages.

Qualcomm Europe "[Draft] LS on E-UTRAN security related issues" 3GPP TSG RAN WG3 Meeting #60, R3-082280, 2008, 2 pages.

NEC "Signalling of eNB security capabilities" 3GPP TSG RAN WG3#58, R3-072282, 2007, 6 pages.

Nokia Corporation et al. "CR-33401: Physical Cell Id Binding Removal" 3GPP TSG SA WG3 Security—S3#51, S3-080762, 2008, 7 pages.

NTT DoCoMo et al. "Further KeNB forward security simplification" 3GPP TSG SA WG3 Security—SA3#52, S3-080834, 2008, 5 pages.

NTT DoCoMo et al. "CR-33401: KeNB forward security solution" 3GPP TSG SA WG3 Security—S3#51, S3-080846, 2008, 14 pages.

Huawei "UE Context Modification procedure" 3GPP TSG RAN WG3 Meeting #59, R3-080249, 2008, 8 pages.

Nokia et al. "Pseudo-Change Request to TR 33.821 v0.1.0: Update of section 7.4.13 on security algorithm negotiation in SAE/LTE" 3GPP TSG SA WG3 Security—SA3#46b, S3-070233, 2007, 8 pages.

Huawei et al. "Pseudo-Change Request to TR 33.821 v0.1.0: Update of section 7.4.13 on security algorithm negotiation in SAE/LTE" 3GPP TSG SA WG3 Security—SA3#46b, S3-070288, 2007, 8 pages.

Nokia et al. "Security Mode Command procedure update" 3GPP TSG SA WG3 Security—S3#47, S3-070367, 2007, 8 pages.

3rd Generation Partnership Project; Technical Specification Group Services and System Aspects; 3GPP System Architecture Evolution (SAE); Security architecture (Release 11), 3GPP TS 33.401 V11.2.0, 2011, 124 pages.

"ETSI TS 136 413," May 2011, Version 9.6.1, pp. 32-34, 76 and 117, http://www.etsi.org/deliver/etsi_ts/136400_136499/136413/09.06.01_60/ts_136413v090601p.pdf.

First Office Action dated Jul. 4, 2017, issued in Chinese Patent Application No. 201280067720.9, 2 pages.

* cited by examiner

OPERATION OF A SERVING NODE IN A NETWORK

CROSS REFERENCE TO RELATED APPLICATION(S)

This application is a continuation of U.S. application Ser. No. 15/600,225, filed May 19, 2017, which is a continuation of U.S. application Ser. No. 14/374,455, filed Jul. 24, 2014, now U.S. Pat. No. 9,661,534, which is a 35 U.S.C. § 371 National Phase Entry Application from PCT/EP2012/057471, filed Apr. 24, 2012, designating the United States, and also claims the benefit of U.S. Provisional Application No. 61/590,930, filed Jan. 26, 2012. The disclosures of which are incorporated herein in their entirety by reference.

TECHNICAL FIELD

The present invention relates to a method and apparatus for operating a serving node and base station in a network. In particular, the invention relates to the repair of corrupt context information.

BACKGROUND

Long Term Evolution (LTE) is a communication network technology currently under development by the 3rd Generation Partnership Project (3GPP). LTE requires a new radio access technique termed Evolved Universal Terrestrial Radio Access Network (E-UTRAN), which is designed to improve network capacity, reduce latency in the network, and consequently improve the end-user's experience. System Architecture Evolution (SAE) is the core network architecture for LTE communication networks.

Referring to FIG. 1, the LTE/SAE architecture includes a Mobility Management Entity (MME) 1, which is responsible for control signalling. An SAE Gateway (SAE-GW) 2 is responsible for the user data. The SAE-GW 2 consists of two different parts, namely a Serving Gateway that routes user data packets, and a PDN Gateway that provides connectivity between a user device and an external data network. These nodes are described in detail in 3GPP Technical Specification (TS) 23.401. All these nodes are interconnected by an IP network. Further nodes are the eNodeBs (eNBs) 3, 4, which act as base stations in the network and communicate with terminals (UEs) 5, 6. There are three major protocols and interfaces between these node types. These are S1-MME (between the eNBs 3, 4 and the MME 1), S1-U (between the eNBs 3, 4 and the SAE-GW 2, or more correctly between the eNBs 3, 4 and the Serving Gateway), and X2 (between eNBs 3, 4). The corresponding protocols used in these interfaces are S1AP (S1 Application Protocol) and X2AP (X2 Application Protocol). All these protocols and interfaces are IP-based. In addition, the network may contain other nodes that are part of the above interface, for example a Home eNodeB Gateway (HeNB GW) between a HeNB and rest of the nodes in the network. The MME is often located in the core network and the eNBs are often located in the radio access network.

The LTE system provides confidentiality and integrity protection for data transmitted between the network and a terminal. These security services are provided by the use of ciphering and integrity protection algorithms. Such algorithms are jointly described hereinafter as security algorithms. For ciphering and integrity protection to work in LTE, the network and the terminal must use the same security algorithms to process the data. The processing using the security algorithms is carried out by the MMEs and the eNBs.

WO 2009/120122 describes a system for enabling the LTE network and a terminal to negotiate security algorithms to use for protecting their communication. This idea was later adopted by the LTE specifications and is included in TS 33.401.

FIG. 2 illustrates part of the security algorithm negotiation described in more detail in TS 33.401. The network elements correspond to those shown in FIG. 1.

The terminal, or the User Equipment (UE) 5 as it is called in TS 33.401, supports a particular set of security algorithms, which can be referred as the UE security capabilities. When the UE 5 registers with an MME 1, for example as part of an Attach procedure or a Tracking Area Update procedure, the UE informs the MME about its UE security capabilities. This is done in a secure fashion so that the MME can be sure that the UE security capabilities it has received are correct. The MME can thus trust the received information. In FIG. 2 the first Attach message S201 represents this step.

When the UE 5 connects to a source eNB3, the MME 1 informs the source eNB 3 about the UE security capabilities for the UE 5. This is done using a UE CONTEXT SETUP message S202. The source eNB 3 uses this information to select, in step S203, which security algorithms to use when it communicates with the UE 5. For example, the source eNB would of course only select a security algorithm if it is present in the UE security capabilities. Once the source eNB has made its choice, it informs the UE about the selection using a Security Mode Command S204. After this, the UE and the source eNB can communicate securely using the selected security algorithms.

If the UE 5 is handed over from the source eNB 3 to a target eNB 4 using an X2-handover procedure, the source eNB 3 forwards the UE security capabilities it received from the MME to the target eNB 4 in a HANDOVER REQUEST message S205. The target eNB 4 then selects, in step S206, which security algorithms to use when communicating with the UE based on the received UE security capabilities. The target eNB 4 sends a HANDOVER COMMAND message S207 to the UE 5, which includes details of the security algorithms selected. The UE 5 activates the selected security algorithms in step S208 based on the information provided in the HANDOVER COMMAND message, and the same security algorithms are activated by the target eNB 4 in step S209.

After this, the target eNB 4 sends a PATH SWITCH REQUEST message S210 to the MME 1, which returns an acknowledgement message S211. The PATH SWITCH REQUEST message S210 includes details of the UE security capabilities received by the target eNB 4 from the source eNB 3. This enables the MME 1 to compare the UE security capabilities received in the PATH SWITCH REQUEST S210 with the UE security capabilities received in the Attach message S201 when the UE 5 first registered with the MME 1. Any difference raises the possibility that a security downgrade attack has taken place, and it may then be appropriate for the MME 1 to raise an alarm.

One example of a security downgrade attack, as envisaged when the mechanism described above was designed, is that an attacker could break into the source eNB 3. The source eNB 3 could then remove the strongest security algorithms (or even all security algorithms) from the UE security capabilities after they have been received from the MME 1 in step S22. When the X2 handover S25 occurs, the target eNB 4 would receive the modified UE security capabilities from the source eNB 3, but since the UE security capabilities no longer include any strong security algorithms, the target eNB 4 is forced to make a less secure choice in identifying the strongest security algorithm it has in common with the UE 5.

The negotiation described above (and specified in TS 33.401) has a shortcoming. Even though the MME 1 will detect the downgrading attack, the system does not recover from the attack until the UE 5 goes to IDLE state or until the UE 5 carries out an S1 handover. A UE that stays connected for a longer period will therefore be a victim of the attack at the source eNB 3 even after an X2 handover to the target eNB 4. Even though the network has detected the attack, the effect remains despite the fact that the UE is now connected to an honest and non-compromised eNB.

Examples of such situations when a UE stays connected for long periods include a user listening to streaming internet radio or watching streaming video. This can be quite common. Furthermore, the user may have other data sessions, in addition to the streaming video or radio, which could be eavesdropped on by the attacker.

In addition, current discussions in 3GPP involve the use of direct X2 interfaces between two Home eNBs and between Home eNBs and regular macro eNBs. The problem described may therefore become more widespread.

It is commonly known that customer premises equipment are broken into by hackers and security hobbyists. There are examples of hackers breaking into UMTS home base stations. It is quite probable that similar attacks will be possible against particular implementations of home base stations in LTE (Home eNBs).

If a Home eNB that is connected with a direct interface to a macro eNB is compromised, (e.g. by its hosting party using similar techniques used against UMTS home base stations), then the attacker could easily carry out the downgrade attack described above for any UE connected to his Home eNB. When the subscriber then moves into the macro network via a direct interface handover, the attacker can listen to the radio of the victim, and the downgrade attack results in the transmission of all the data in clear text or encrypted with a weak security algorithm that the attacker can break.

This is the same type of attack as described above, but the home eNB aspect shows that a compromise of a base station is more likely here. The attacker can also work uninterrupted in his own home.

In addition to the security implications described above, a further problem with the existing arrangements relates to upgrading of security algorithms in nodes of the network. When a new security algorithm is introduced in the specifications, it cannot always be assumed that it will be implemented in all nodes in the network at once. For example, the MME 1 may implement the new algorithms whereas the source eNB 3 to which the UE 5 connects does not. This is not a problem. The MME 1 informs the source eNB 3 in step S22 of the security capabilities of the UE 5. If these are better than those supported by the eNB 3, the source eNB 3 will just ignore the extra algorithms.

The problem arises when the source eNB 3 forwards the UE security capabilities to the target eNB 4. Even though the source eNB 3 is not compromised, in step S203 it re-codes the UE security capability information (received from the MME in step S202) to a different format. This is necessary because the protocol used between the MME 1 and eNB 3 is different to that used between two eNBs. As a result, the source eNB 3 ignores the information that the UE supports the new security algorithm, and does not include this information when sending the UE security capability information to the target eNB 4 in step S205. So, even if the target eNB 4 has been upgraded and supports the new security algorithm, it will not receive the information that the UE 5 also supports the new algorithm, and the new algorithm will not be used by the target eNB 4.

So just as described above when an attack has taken place, the system will not self heal until an S1 handover occurs or the UE goes to IDLE state. And, as previously discussed, this may take a considerable time.

This also leads to a further problem. After each X2-handover the target eNB 4 reports the UE security capability information to the MME 1 in step S210, and the MME 1 will find that it does not match the UE security capability information received from the UE 5 at registration (step S201). The MME 1 will take some action, for example raising an alarm, and continue repeating the action specified every time the report is received from a target eNB. In other words, the fact that a target eNB 4 has been upgraded but a source eNB 3 has not will result in the alarm being raised every time a handover of this type takes place, whether or not there has been a security breach.

Effectively, therefore, eNBs that have not been upgraded with the new algorithm will prevent eNBs that have been upgraded from using the best possible algorithm.

SUMMARY

The object of the present invention is to alleviate the above problems.

In accordance with one aspect of the present invention there is provided a serving node for use in a telecommunications network. The serving node comprises a communications unit for sending and receiving data, a storage medium for storing data, and a control unit for controlling the operation of the communications unit and the storage medium. The communications unit is configured to receive security capabilities of a terminal when the terminal registers with the serving node (for example using an Attach message or a Track Area Update Request). The storage medium is configured to store the security capabilities The communications unit is configured to receive a path switch request message (usually following an X2 handover request received by a target base station for handover of the terminal), the path switch request including another indication of security capabilities of the terminal. In response, the communications unit is configured to send the stored security capabilities to the target base station, enabling reselection of security algorithms for use in communications between the target base station and terminal.

The path switch request will usually be received from the target base station following an X2 handover request sent from a source base station to the target base station.

The control unit may be configured to determine whether the stored security capabilities should be sent to the target base station, and the communications unit may be configured to send the stored security capabilities on the basis of the determination carried out by the control unit.

The determination of whether the stored security capabilities should be sent to the target base station may depend on a number of factors. In one embodiment the storage medium is configured to store security upgrade details of base stations in the network, and the control unit is configured to instruct the communications unit to send the stored security capabilities to the target base station if the security of some base stations in the network has been upgraded but the security of the source base station has not. An upgrade in the security of the source base station would then result in the selection of improved security parameters with the terminal.

Alternatively or in addition, the control unit may be configured to instruct the communications unit to send the stored security capabilities to the target base station if the security of the target base station has been upgraded.

Another alternative (which again may be complementary or additional to the previous options) would be for the control unit to be configured to instruct the communications unit to send the stored security capabilities to the target base station if the indication of the security capabilities of the terminal received in the path switch request message does not match the stored security capabilities.

Another option would be for the communications unit to send the stored security capabilities to the target base station every time it receives a path switch request message, irrespective of whether upgrades have taken place and/or there is a mismatch.

The communications unit is configured to send the stored security capabilities to the target base station in a context modification request, or in a path switch request acknowledgement message.

The network may be an LTE network and the serving node may be an MME.

In accordance with another aspect of the present invention there is provided a base station for use in a telecommunications network. The base station comprises a communications unit for sending and receiving data, a storage medium for storing data and a control unit for controlling the operation of the communications unit and the storage medium. The communications unit is configured to receive an X2 handover request for handover of a terminal from a source base station, the X2 handover request including security capabilities of the terminal. The control unit is configured to select security algorithms for use in communications between the base station and the terminal following the handover, the selection of the security algorithms being based on the received security capabilities of the terminal. The communications unit may send a handover command message to the terminal, the handover command message including an indication of the selected security algorithms. The communications unit is configured to send a path switch request to a serving node, the path switch request including the received security capabilities. The communications unit is configured to receive a message (optionally from the serving node) comprising replacement security capabilities of the terminal. The control unit is configured to select new security algorithms for use in communications between the base station and the terminal based on at least the replacement security capabilities. The communications unit is configured to send to the terminal an indication of the new selected security algorithms.

The message containing the replacement security capabilities may be a context modification request or may be a path switch request acknowledgement message.

The control unit may be configured to determine whether the replacement security capabilities received from the serving node are different to the security capabilities received in the X2 handover request, and only to select new security algorithms if so.

In accordance with another aspect of the present invention there is provided a method of operating a serving node in a telecommunications network. The method comprises receiving security capabilities of a terminal when the terminal registers with the serving node and storing the received security capabilities. A path switch request message is received, optionally from a target base station, following an X2 handover request sent from a source base station to the target base station for handover of the terminal. The path switch request includes the security capabilities of the terminal. The method further includes sending the stored security capabilities to the target base station.

The stored terminal security capabilities may be sent to the target base station in a context modification request or in a path switch request acknowledgement message.

In accordance with another aspect of the present invention there is provided a method of operating a base station in a telecommunications network. The method comprises receiving an X2 handover request for handover of a terminal from a source base station, the X2 handover request including security capabilities of the terminal. Security algorithms are selected for use in communications between the base station and the terminal following the handover, the selection of the security algorithms being based on the received security capabilities of the terminal. A handover command message is sent to the terminal, the handover command message including an indication of the selected security algorithms. A path switch request is sent to a serving node, the path switch request including the security capabilities of the terminal. A message comprising replacement security capabilities of the terminal is received, optionally from the serving node. New security algorithms are selected for use in communications between the base station and the terminal based on at least the replacement security capabilities. The selection of the new security algorithms is indicated to the terminal.

In accordance with another aspect of the present invention there is provided a method of operating a telecommunications network. The method comprises registering a terminal with a serving node. Security capabilities of the terminal are sent from the terminal to the serving node as part of the registration procedure, and the security capabilities are stored at the serving node. A source base station sends an X2 handover request to a target base station for handover of the terminal from the source base station, the X2 handover request including an additional indication of security capabilities of the terminal. The target base station selects security algorithms for use in communications between the target base station and the terminal following the handover, the selection of the security algorithms being based on the received additional indication of the security capabilities of the terminal. The target base station sends a handover command message to the terminal, the handover command message including an indication of the selected security algorithms. The target base station sends a path switch request to the serving node, the path switch request including the additional indication of the security capabilities of the terminal. The serving node sends the security capabilities stored thereon to the target base station, which selects new security algorithms for use in communications between the base station and the terminal based on at least the security capabilities stored at and sent from the serving node. The target base station sends an indication of the selection of the new security algorithms to the terminal.

In accordance with another aspect of the present invention there is provided a computer program product comprising code adapted to be executed on a serving node in a telecommunications network. The code is operable to cause the serving node to receive security capabilities of a terminal when the terminal registers with the serving node and store the received security capabilities. The code also causes the serving node to receive a path switch request message following an X2 handover request sent from a source base station to a target base station for handover of the terminal, the path switch request including the security capabilities of the terminal. The code is further operable to cause the serving node to send the stored security capabilities to the target base station.

In accordance with another aspect of the present invention there is provided a computer program product comprising code adapted to be executed on a base station in a telecommunications network. The code is operable to cause the base station to receive an X2 handover request for handover of a terminal from a source base station, the X2 handover request including security capabilities of the terminal, and to select security algorithms for use in communications between the base station and the terminal following the handover, the selection of the security algorithms being based on the received security capabilities of the terminal. The code is further operable to cause the base station to send a handover command message to the terminal, the handover command message including an indication of the selected security algorithms. The code is further operable to cause the base station to send a path switch request to a serving node, the path switch request including the security capabilities of the terminal, and to receive a message comprising replacement security capabilities. The code is further operable to cause the base station to select new security algorithms for use in communications between the base station and the terminal based on at least the replacement security capabilities, and to indicate the new security algorithms to the terminal.

The invention also provides the computer program product described above, carried on a carrier medium such as RAM, ROM, EPPROM, flash memory, diskette or similar.

The invention also provides a computer program comprising computer readable code which, when operated by a serving node or base station in a telecommunications network, causes the serving node or base station to carry out the methods described above. The invention further provides a computer program product comprising a computer readable medium and a computer program as just described, wherein the computer program is stored on the computer readable medium

DETAILED DESCRIPTION

Figure 1:
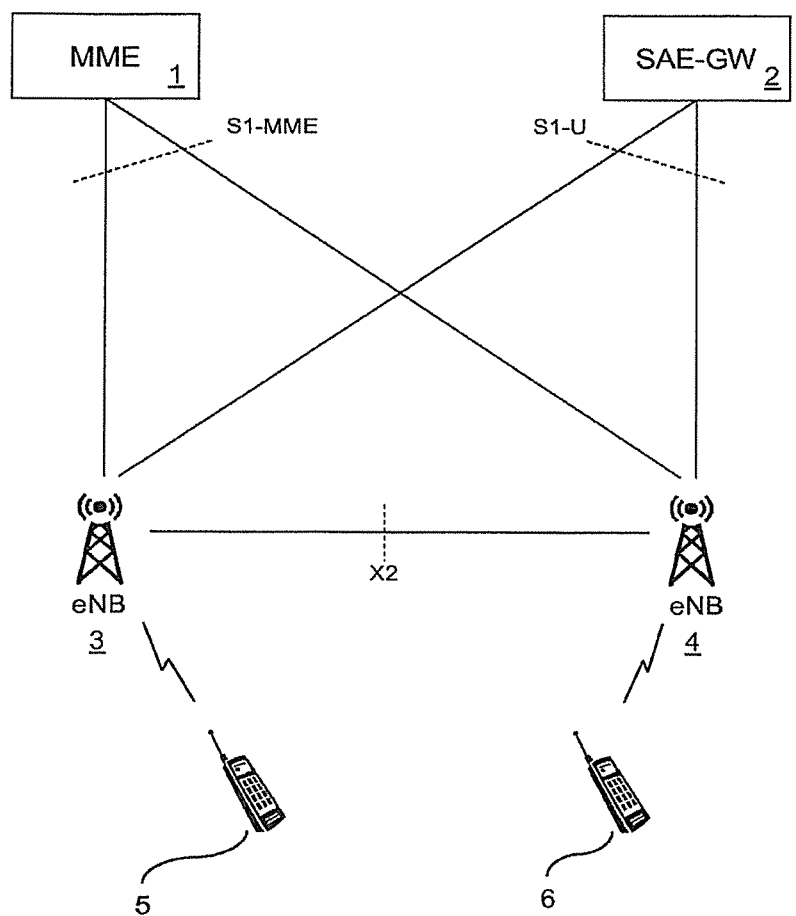
FIG. 1 is a schematic illustration in a block diagram of an LTE/SAE network architecture.

As described above, upgrading some eNBs in the network can lead to problems with handovers, resulting in the use of unnecessarily obsolete security algorithms, and in the possibility of false alarms being raised. Two solutions appear to be possible using the LTE specifications in their current form.

One alternative might be to upgrade all eNBs simultaneously. This approach may be feasible in the early lifetime of LTE (i.e. when there are no—or very few legacy eNBs and MMEs) when a security algorithm is introduced. However in the long term, as networks grow, this solution is likely to lead to high costs and is not thought to be practical.

The other alternative might be to configure the network so that eNBs which are not upgraded with the new security algorithm only use an S1 handover. The reason that this configuration could address the problem is that, in an S1 handover, the two eNBs do not communicate directly, but rather send all their messages via the MME. The MME effectively acts as a proxy. Since the MME already knows the correct UE security capabilities, the MME will send these to the target eNB. The target eNB will hence know that the UE supports the new security algorithm even though the source eNB did not forward this information.

A configuration solution like this may be possible in some cases, but as the deployment of eNBs become denser, X2 handovers will be more and more frequent because X2 handovers lead to a reduced load on the core network compared to S1 handovers. In addition, network topology may be so complex that it is not practical to change the configuration to use the S1 handover instead of X2 handover. Especially if the intention is to change the configuration only temporarily while awaiting upgrade of all the eNBs in the area, it is likely that the system would instead be left in a vulnerable configuration due to the high cost of the configuration, and there would be a risk of misconfiguration leading to dropped connections.

Referring back to FIG. 2, it can be seen that no signalling takes place between the MME 1 and the target eNB 4 before the target eNB makes a choice (in step S206) as to which security algorithms should be used. This choice is based on the security capability information received from the source eNB 3 in step S205. For an X2 handover there is thus no way for the target eNB to determine whether or not the UE 5 supports the new algorithm, and if not all nodes have been upgraded, the target eNB cannot assume that the UE 5 supports the new algorithm.

It should be noted that, for the purposes of the above discussion, whether or not the source eNB has been upgraded determines whether or not it can forward the support of the new security algorithm in the UE security capabilities. An "upgraded" eNB need not be able to select and use the new security algorithm itself when communicating with UEs. So the term "upgraded" is here used to mean that the source eNB 3 is able to signal to the target eNB 4 that the UE 5 supports the new security algorithm in the S1AP and X2AP protocols.

The following discussion sets out possibilities for addressing the problems described above. In the discussion, the MME is used as a representative node in the core network. However, it will be appreciated that it is also possible for the Home eNB gateway or other node to take on this role.

Figure 2:
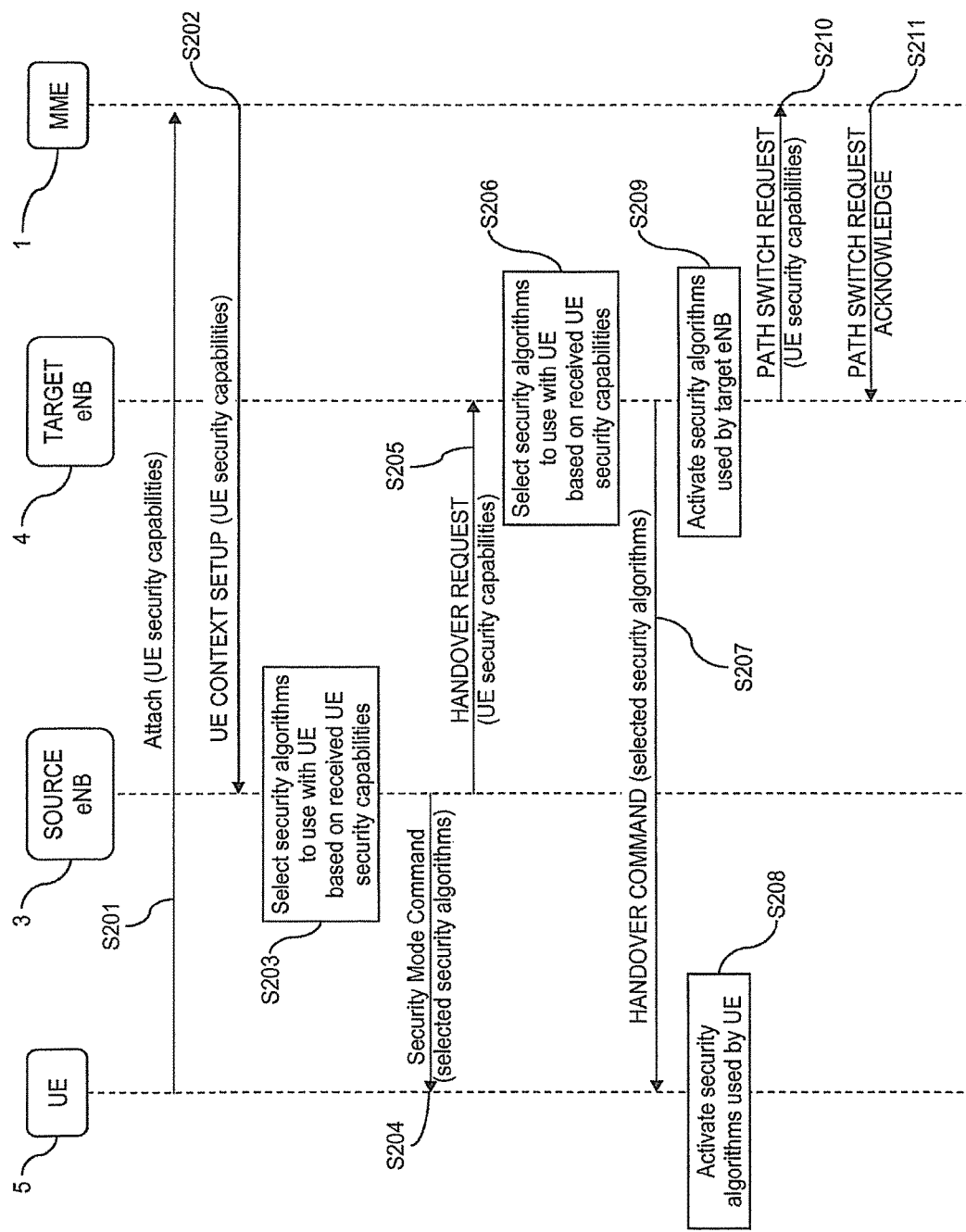
FIG. 2 is a signalling diagram illustrating an X2 handover in accordance with TS 33.401.
Figure 3:
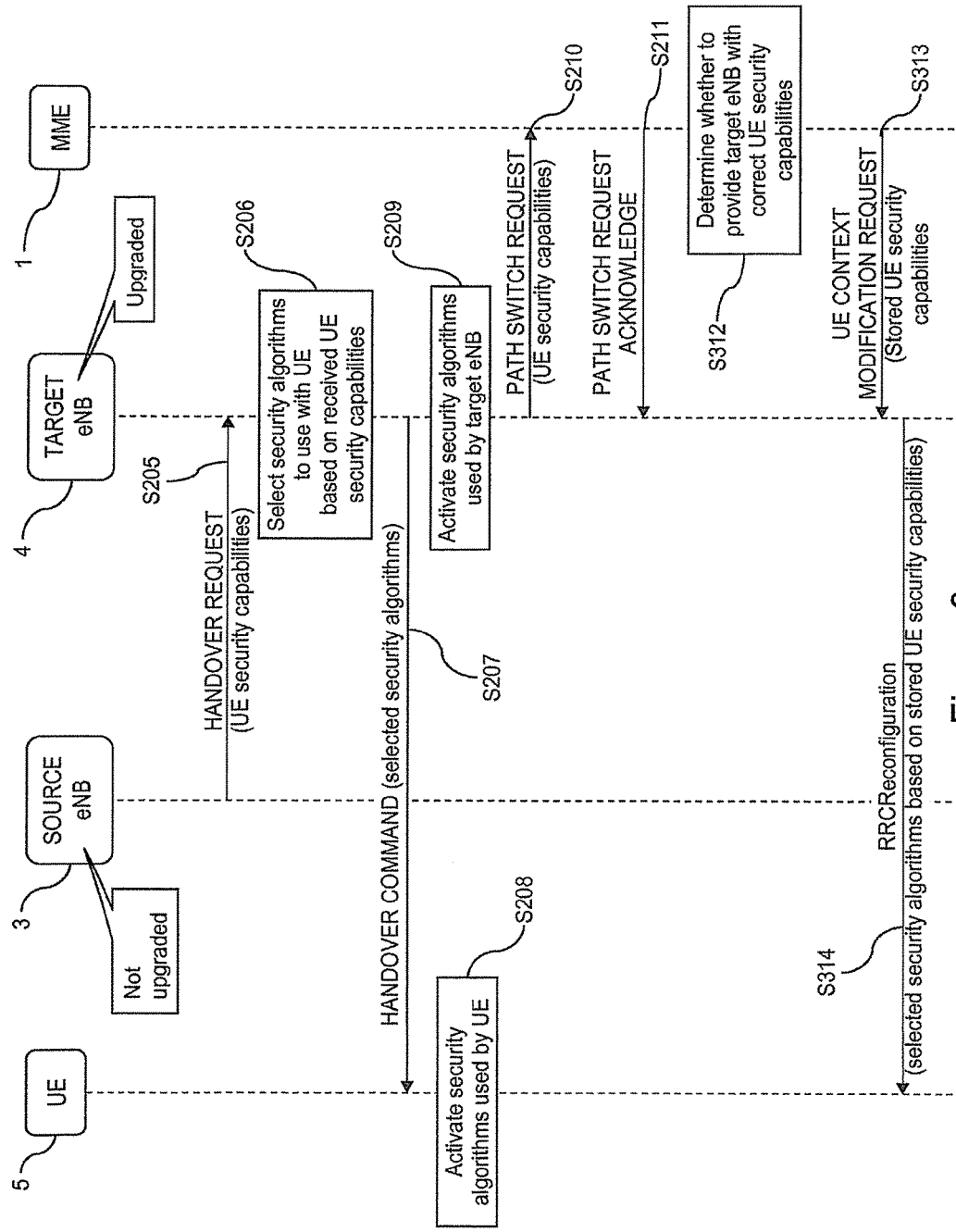
FIG. 3 is a signalling diagram illustrating a process for enabling an upgraded eNB to use updated security algorithms following a handover.

FIG. 3 is a signalling diagram illustrating a suitable process (a first approach) which enables an upgraded eNB to use up to date security algorithms following a handover. Network nodes and signalling steps common with FIG. 2 are represented by the same reference numerals, and it can be assumed that the attachment procedure of the UE 5 to the source eNB 3 has already taken place. As before, when a handover is initiated, a handover request S205 including the UE security capabilities is sent from the source eNB 3 to the target eNB 4 as before. The target eNB 4 selects security algorithms based on the details of the UE capabilities provided by the source eNB and its own capabilities in step S206 and returns a handover command S207 to the UE with selected security algorithms. The UE and target eNB activate security algorithms S208, S209, and a path switch request S210 containing these security algorithms is sent to the MME 1, which is acknowledged in step S211.

The process now provides additional steps to enable the MME 1 to act on the information contained in the path switch request S210. In this approach, the MME 1 is configured with information about which eNBs have been upgraded and which have not. When the MME 1 detects that an X2 handover has occurred from an eNB 3 which has not been upgraded (in this case the source eNB 3), it decides in step S312 whether the target eNB 4 should be provided with the correct UE security capabilities. One way of implementing this is for the MME 1 to run a S1 UE CONTEXT MODIFICATION procedure S313 with the target eNB 4. During this procedure, the MME uses the information element that carries UE security capabilities (which exists in today's signalling) to provide the target eNB with the correct UE security capabilities. As a result the target eNB runs a key-change on-the-fly with the UE. The main purpose of this procedure is to establish a new key between the eNB and the UE. However, the procedure is initiated by running a RRCReconfiguration procedure S313 which changes the security configuration in the UE and the eNB. As part of changing the security configuration, a new key is established and security algorithms are re-selected. The selection will at this point be made based on the correct UE security capabilities received from the MME 1.

Figure 4:
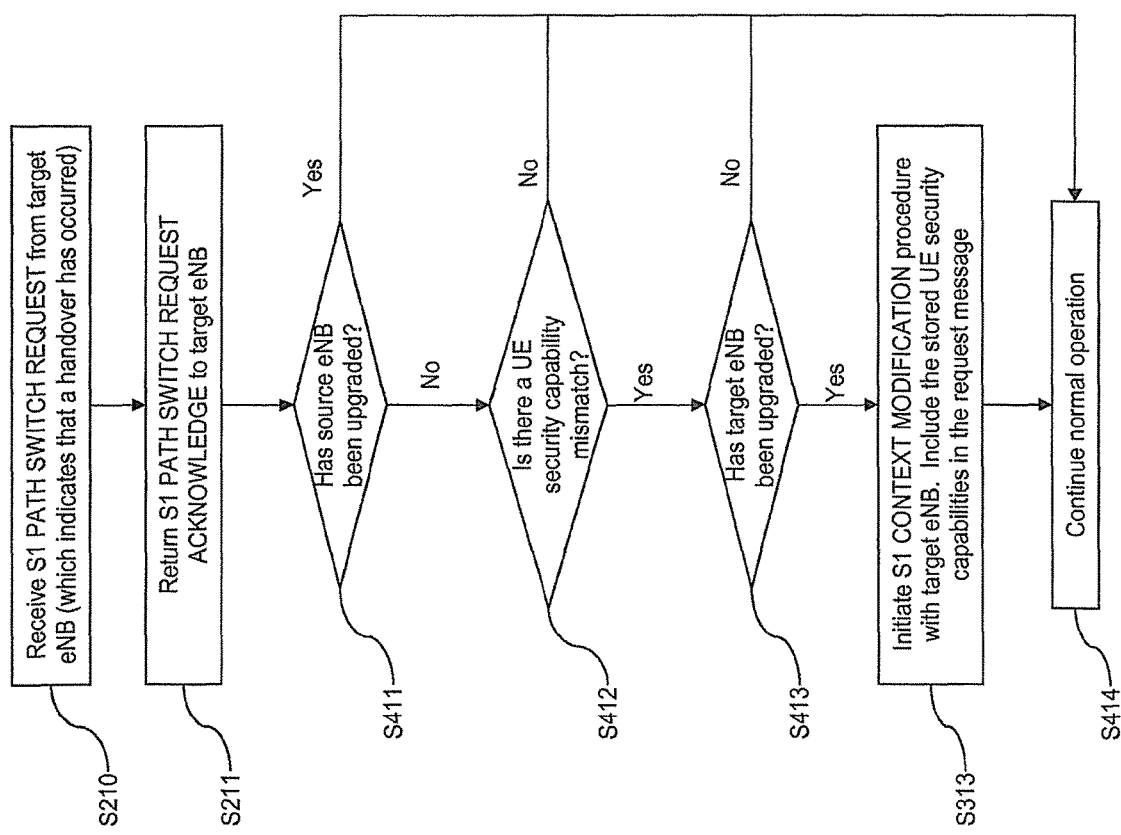
FIG. 4 is a flow diagram illustrating in more detail the steps carried out by the MME in carrying out the process shown in FIG. 3.

A process flow which provides more detail of step S312 is illustrated in FIG. 4. In steps S210 and S211 the MME1 receives and acknowledges the path switch request from the target eNB. Logic in the MME 1 looks up in a storage medium associated with the MME whether or not the source eNB 3 has been upgraded in step S411. If it has, then there should be no danger of it having sent obsolete UE security capabilities to the target eNB 4 in the handover request S205, and (at least in some embodiments) it may be assumed that the security algorithms selected by the target eNB are the most recent available to the target eNB. Of course, if the source eNB 3 has been upgraded but the target eNB 4 has not, the target eNB can still only use the pre-upgrade algorithms, but this does not result in a conflict. In this case no additional information needs to be sent to the target eNB 4 and normal operation can continue S414.

If the source eNB has not been upgraded, the MME1 checks in the storage medium (step S412) whether or not there is a UE security capability mismatch between the security capabilities originally provided by the UE 5 in the attachment procedure S201 and those provided by the target eNB 4 in the path switch request S210. If there is no mismatch then there is no problem, and again normal operation can continue S414.

If there is a UE security capability mismatch, then the MME 1 optionally checks (step S413) to verify which eNBs have been upgraded and identify whether if the target eNB 4 has itself been upgraded. If the target eNB has been upgraded then the S1 CONTEXT MODIFICATION REQUEST S313 is sent to the target eNB with the UE security capabilities held by the MME 1.

A very simplified logic in the MME may be to decide that the S1 UE CONTEXT MODIFICATION procedure S313 should always be run when an X2 handover has occurred from a source eNB that is not upgraded. This would be simpler to implement, but would cause extra signalling in the network and between the eNB and the UE.

In another alternative it could be that the MME always decides that the S1 UE CONTEXT MODIFICATION procedure S313 should be run if there is a UE security capability mismatch, to ensure that any service attacks are dealt with promptly.

Figure 5:
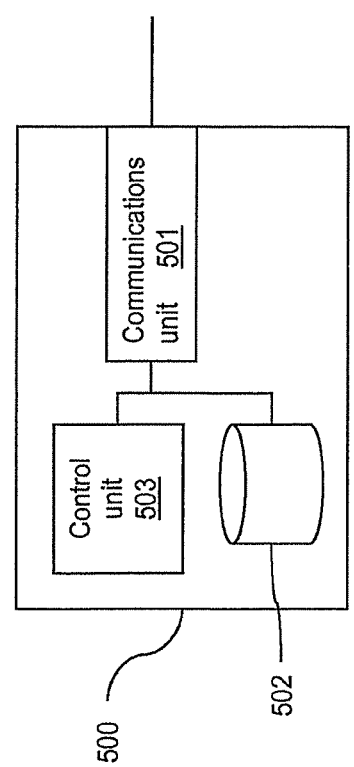
FIG. 5 is a schematic illustration of an exemplary serving network node configured to carry out the process shown in FIGS. 3 and 4.

FIG. 5 is a schematic illustration of an exemplary serving network node 500 which could for example be the MME 1 shown in FIG. 3. The node 500 includes a communications unit 501 for sending and receiving data, a storage medium 502 for storing data, and a control unit 503 for controlling the operation of the communications unit 501 and storage unit 502. It will be appreciated that the control unit 503 can be operated by hardware or software. The control unit 503 enables the serving network node 500 to carry out the operations described above.

In order for the serving node to carry out the operations described above, the storage medium 502 contains information about which eNBs are upgraded and which are not. The storage medium 502 also contains information about the UE security capabilities for each UE. The control unit includes logic for initiating a S1 UE CONTEXT MODIFICATION with the target eNB when necessary, to provide the target eNB with the correct UE security capabilities and hence allow the target eNB to select the new security algorithm. This may be as a program installed on a processor, or via a processor connected to a carrier medium such as RAM, ROM, EPPROM, flash memory, diskette or similar (not shown) on which a suitable program is saved. The carrier medium may be incorporated into the serving node or may be portable to enable the program to be brought to the serving node.

It will be noted that the eNBs 3, 4 do not need to be modified to carry out the process described above. When the target eNB 4 receives the S1 UE CONTEXT MODIFICATION REQUEST message S313 from the MME 1, it is triggered to carry out the reselection of the security algorithms between the eNB 4 and the UE 5 according to TS 33.401.

A second approach removes the need for the S1 UE CONTEXT MODIFICATION message. Instead, the S1 PATH SWITCH REQUEST ACKNOWLEDGE message S211 from the MME 1 is enhanced to enable inclusion of an information element to carry the UE security capabilities. The MME 1 uses this information element to provide the correct UE security capabilities to the target eNB 4 after an X2 handover. This alternative approach second embodiment is depicted from a signalling point of view in FIG. 6 and from a processing point of view in FIG. 7.

Figure 6:
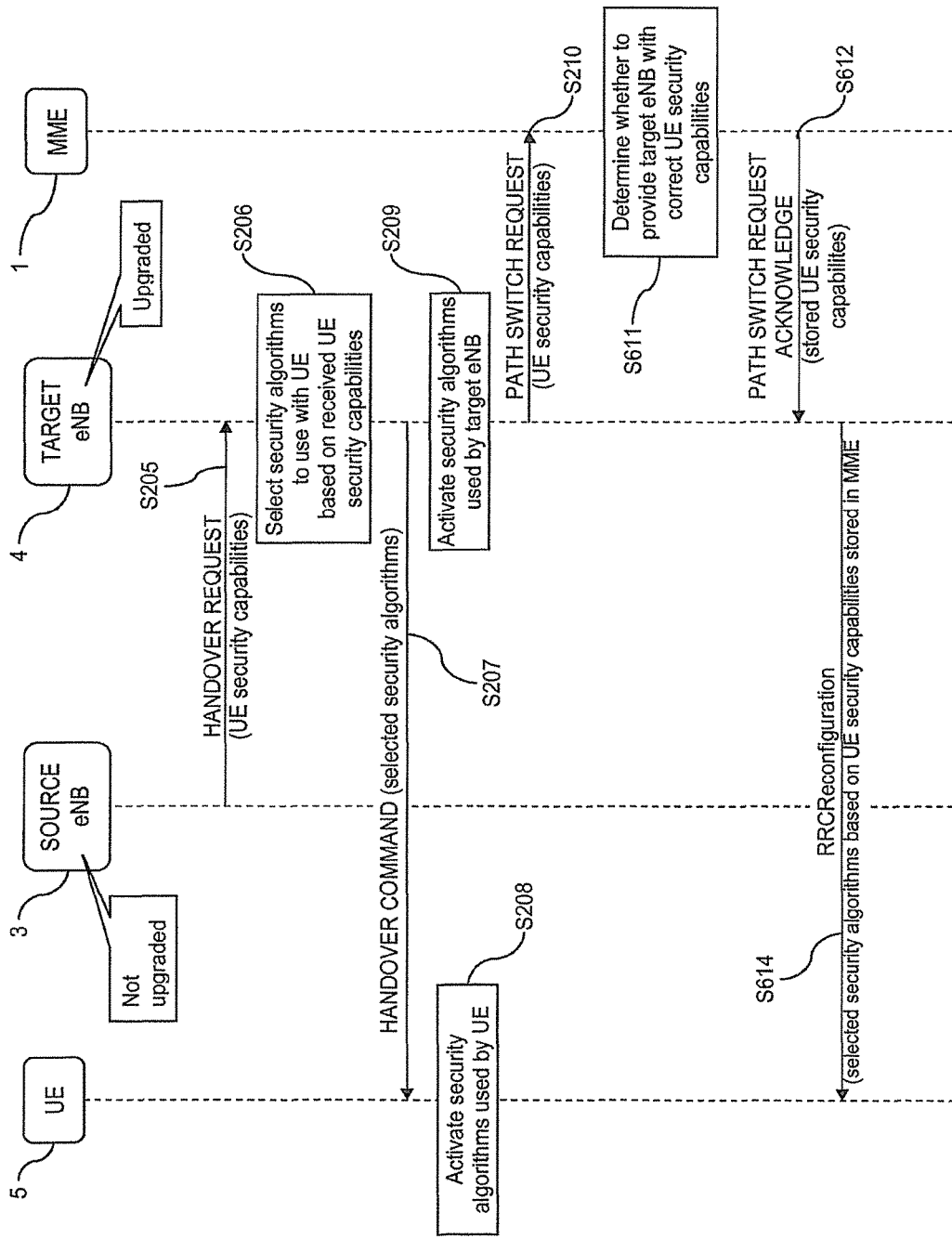
FIG. 6 is a signalling diagram illustrating an alternative process for enabling an upgraded eNB to use updated security algorithms following a handover.

FIG. 6 shows the sequence of events, and is identical to FIG. 3 up to the point at which the path switch request S210 is received by the MME 1. At this point, instead of immediately acknowledging the path switch request, the MME 1 first identifies whether or not the target eNB needs to be provided with the correct UE security capabilities in step S611. The logic involved in this decision can be essentially the same as for the first approach described above—i.e. the same as that required to choose whether or not to run the S1 UE CONTEXT MODIFICATION procedure S313

Figure 7:
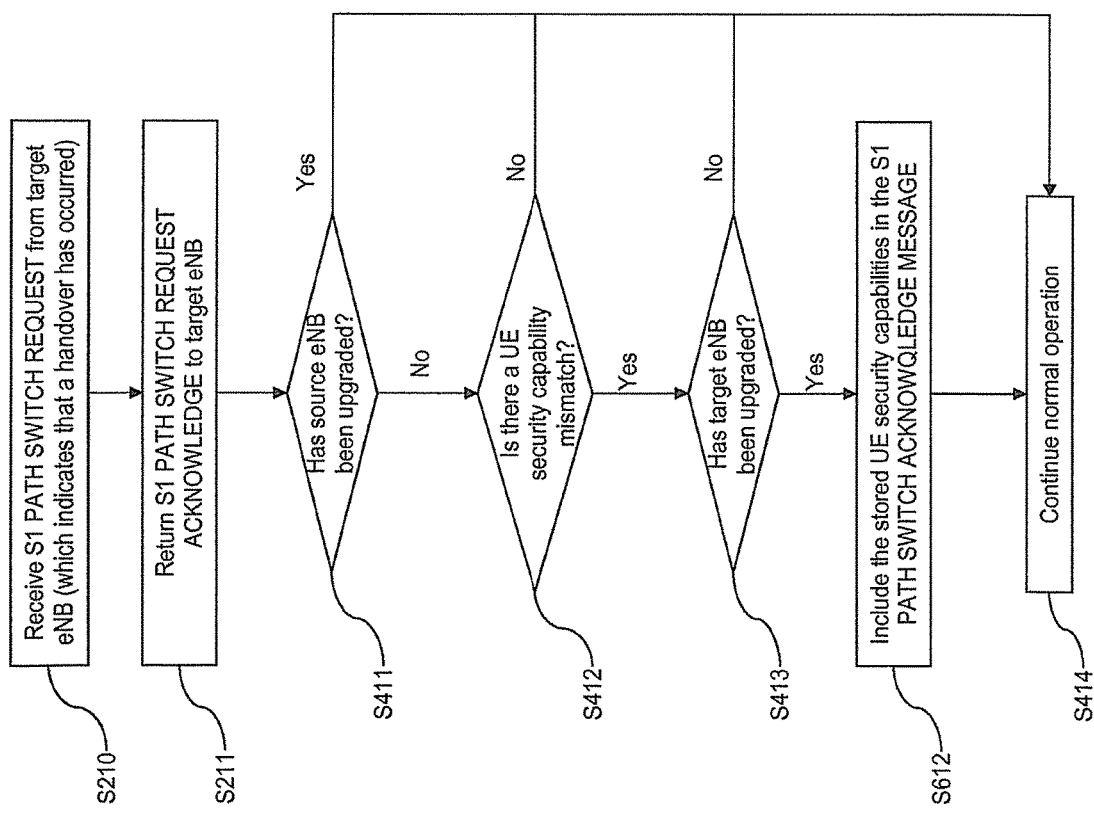
FIG. 7 is a flow diagram illustrating in more detail the steps carried out by the MME in carrying out the process shown in FIG. 6.

The logic for the MME for including the correct UE security capabilities in the S1 PATH SWITCH REQUEST ACKNOWLEDGE may be the same as that described for choosing to run the S1 UE CONTEXT MODIFICATION procedure in the first embodiment. FIG. 7 is thus identical to FIG. 4 except that step S313 (initiate S1 CONTEXT MODIFICATION procedure) has been replaced by step S612 (Include the stored UE security capabilities in the S1 PATH SWITCH ACKNOWLEDGE MESSAGE).

Alternatively, the S1 PATH SWITCH REQUEST ACKNOWLEDGE message S612 may be enhanced to include the UE security capabilities unconditionally—i.e. whether or not there is a UE security capability mismatch or the source eNB or target eNB have been upgraded. This option has the advantage that the protocol specifications and implementations become simpler. It also reduces the chances of misinterpretation of the specifications, leading to possible interoperability problems between eNBs and MMEs from different vendors.

The configuration of the MME 1 for this second approach is again that of the serving node 500 shown in FIG. 5: the difference is that the control unit 503 is configured to amend the PATH SWITCH ACKNOWLEDGEMENT message to include the UE security capabilities, rather than send a separate S1 CONTEXT MODIFICATION message.

Figure 8:
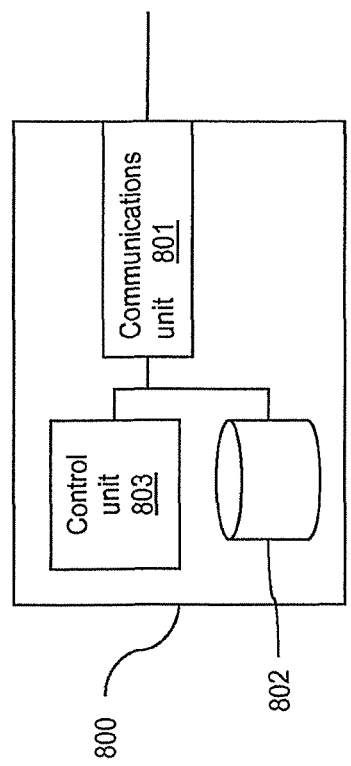
FIG. 8 is a schematic illustration of an exemplary base station configured to carry out the process shown in FIGS. 6 and 7.

However, for this second approach, the eNBs should also be upgraded so that they can take into account the UE security capabilities received from the MME, since there is no CONTEXT MODIFICATION message that would trigger them to act. A schematic diagram of a base station (eNB) 800 capable of participating in this process is shown in FIG. 8. The base station includes a communications unit 801 for sending and receiving data, a storage medium 802 for storing data, and a control unit 803 for controlling the operation of the communications unit 801 and storage unit 802. It will be appreciated that the control unit 803 can be operated by hardware or software, and may include a processor having suitable code installed thereon, or a processor connected to a carrier medium such as RAM, ROM, EPPROM, flash memory, diskette or similar (not shown) containing a suitable program. The carrier medium may be incorporated into the base station or may be portable to enable the program to be brought to the base station. The control unit 803 enables the eNB 800 to carry out the operations required and includes logic for processing the received UE security capability information in the S1 PATH SWITCH REQUEST ACKNOWLEDGE message. This logic may include reselecting the currently used security algorithms used to communicate with the UE, and basing this reselection on the UE security capabilities received from the MME.

The control unit 803 may cause the target eNB 4 to run an RRCReconfiguration procedure S614 with the UE 5 to reselect the security algorithms with the UE based on the UE security capabilities received from the MME 1. This process is optional: instead, the UE security capabilities received from the MME 1 could be stored in the storage medium 802 in place of the (potentially incorrect) UE security capabilities received from the source eNB 3. If the control unit 803 of the target eNB 4 chooses to store the UE security capabilities received from the MME 1 without re-selecting the security algorithms with the UE 5, the target eNB will (if it is upgraded) include these UE security capabilities in the next X2 handover to a new target eNB (not shown in the FIG. 6).

Figure 9:
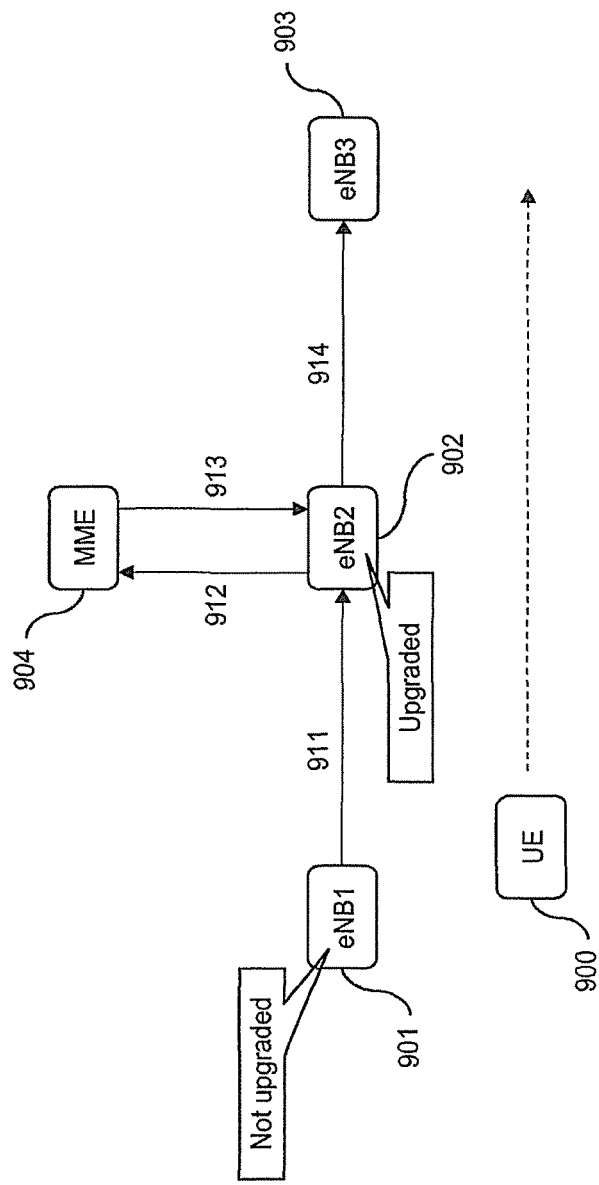
FIG. 9 is a schematic illustration of two consecutive handovers.

This can be understood with reference to FIG. 9, which shows schematically a handover of a UE 900 from a first eNB (eNB1) 901 to a second eNB (eNB2) 902 and then on to a third eNB (eNB3) 903. The UE 900 is initially connected to eNB1 901. The UE 900 supports a new security algorithm. eNB1 901 is not upgraded. A message 911 represents an X2 handover to eNB2 902. Since eNB1 is not upgraded, eNB1 does not forward the fact that the UE 900 supports the new security algorithm in the UE security capabilities to eNB2 in message 911. eNB2 902 is upgraded and supports both signalling and use of the new security algorithm. Since eNB2 902 cannot deduce from the UE security capabilities received from eNB1 that the UE supports the new algorithm, eNB2 does not select the new security algorithm. After the X2 handover, eNB2 reports the UE security capabilities (received from eNB1) to the MME 904 in message 912 (which corresponds to the S1 PATH SWITCH REQUEST S210). The MME 904 sends a S1 PATH SWITCH REQUEST ACKNOWLEDGE 913 (which corresponds to step S612) to eNB2 902, and this message includes the UE security capabilities. The MME 904 may have chosen to include the UE security capabilities for example because the MME 904 detected a mismatch between the received UE security capabilities and the stored UE security capabilities. eNB2 902 does not reselect the security algorithms with the UE. However, after this eNB2 decides to hand the UE 900 over to eNB3 903 and sends a handover message 914. Since eNB2 is upgraded, it includes the UE security capabilities received from the MME 904 in the handover message 914 sent to eNB3 903. If eNB3 is upgraded, it will notice that the UE supports the new security algorithm and may select the new security algorithm.

The approaches described above address the fact that the current security algorithm selection mechanism does not provide a good way to mix upgraded and non-upgraded eNBs when new algorithms are introduced in LTE, and that when a compromised eNB has modified the UE security capabilities for a UE the system may not self heal in all cases until after quite some time.

The processes described help to prevent the introduction of new security algorithms in LTE from producing a lot of false alarms etc in the MME when there is a mix of upgraded and non-upgraded eNBs. Furthermore, in radio networks with a mix of upgraded and non-upgraded eNBs, the best security algorithms can be selected as soon as the UE connects to an upgraded eNB without having to go to IDLE state first. This is true even for UEs who are in connected state for long periods (e.g., listening to streaming internet radio).

In addition, when the system is under attack, it is possible to self heal as soon as a UE connects to a non-compromised eNB. Without these systems in place the attacker can still have access to user data after the UE connects to a non-compromised eNB.

It will be appreciated that variations from the above described embodiments may still fall within the scope of the invention. For example, The method and mechanisms above have been explained with reference to LTE, but it will be appreciated that they apply to WCDMA, or any other similar packet-based radio technologies.

The invention is applicable both for uplink and downlink transmissions.

Modifications and other embodiments of the disclosed solutions will come to mind to one skilled in the art having the benefit of the teachings presented in the foregoing descriptions and the associated drawings. Therefore, it is to be understood that the solutions are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A first base station for use in a telecommunications network, comprising:
   a communications unit for sending and receiving data;
   a storage medium for storing data; and
   a control unit for controlling the operation of the communications unit and the storage medium; wherein
   the communications unit is configured to receive a handover request for handover of a terminal from a source base station, the handover request including security capabilities of the terminal;
   the control unit is configured to select security algorithms for use in communications between the first base station and the terminal following the handover, the selection of the security algorithms being based on the received security capabilities of the terminal;
   the communications unit is configured to send a path switch request to a serving node, the path switch request including the received security capabilities;
   the communications unit is configured to receive a first message comprising replacement security capabilities of the terminal; and
   the communications unit is configured to send a second message to a second base station, wherein the second message comprises the replacement security capabilities of the terminal.

2. The base station of claim 1, wherein the second base station is configured to select new security algorithms for use in communications between the second base station and the terminal based on at least the replacement security capabilities.

3. The base station of claim 1, wherein the control unit is configured to determine whether the replacement security capabilities received from the serving node are different to the security capabilities received in the handover request.

4. The base station of claim 1, wherein the communications unit is configured to receive the replacement security capabilities in a context modification request from the serving node.

5. The base station of claim 1, wherein the communications unit is configured to receive the replacement security capabilities in a path switch request acknowledgement message.

6. The base station of claim 1, wherein the communications unit is configured to send a handover command message to the terminal before sending a path switch request to the serving node, the handover command message including an indication of the selected security algorithms.

7. The base station of claim 1, wherein the network is an LTE network and the base station is an eNB.

8. A method of operating a first base station in a telecommunications network, comprising:
   receiving a handover request for handover of a terminal from a source base station, the handover request including security capabilities of the terminal;
   selecting security algorithms for use in communications between the first base station and the terminal following the handover, the selection of the security algorithms being based on the received security capabilities of the terminal;
   sending a path switch request to a serving node, the path switch request including the security capabilities of the terminal;
   receiving a first message comprising replacement security capabilities of the terminal; and
   sending a second message to a second base station, wherein the second message comprises the replacement security capabilities of the terminal.

9. The method of claim 8, wherein the second base station is configured to select new security algorithms for use in communications between the second base station and the terminal based on at least the replacement security capabilities.

10. The method of claim 8, further comprising:
    determining whether the replacement security capabilities received from the serving node are different to the security capabilities received in the handover request.

11. The method of claim 8, wherein the replacement security capabilities are received in a context modification request from the serving node.

12. The method of claim 8, wherein the replacement security capabilities are received in a path switch request acknowledgement message.

13. The method of claim 8, further comprising:
    sending a handover command message to the terminal before sending a path switch request to the serving node, the handover command message including an indication of the selected security algorithms.

14. The method of claim 8, wherein the network is an LTE network and the base station is an eNB.

15. A computer program product comprising a non-transitory computer readable medium storing a computer program for a first base station in a telecommunications network, said computer program comprises code which run by a processor causes said processor to:
    receive a handover request for handover of a terminal from a source base station, the handover request including security capabilities of the terminal;
    select security algorithms for use in communications between the first base station and the terminal following the handover, the selection of the security algorithms being based on the received security capabilities of the terminal;
    send a path switch request to a serving node, the path switch request including the security capabilities of the terminal;
    receive a first message comprising replacement security capabilities; and
    sending a second message to a second base station, wherein the second message comprises the replacement security capabilities of the terminal.

16. The computer program product of claim 15, wherein the second base station is configured to select new security algorithms for use in communications between the second base station and the terminal based on at least the replacement security capabilities.

* * * * *

UNITED STATES PATENT AND TRADEMARK OFFICE
CERTIFICATE OF CORRECTION

PATENT NO. : 10,375,609 B2
APPLICATION NO. : 16/047271
DATED : August 6, 2019
INVENTOR(S) : Karl Norrman It is certified that error appears in the above-identified patent and that said Letters Patent is hereby corrected as shown below:

In the Drawings

In Fig. 3, Sheet 3 of 9, for Step "S313", in Line 4, delete "capabilities" and insert -- capabilities) --, therefor.

In Fig. 6, Sheet 6 of 9, for Step "S612", in Line 4, delete "capabilites)" and insert -- capabilities) --, therefor.

In Fig. 6, Sheet 6 of 9, for Step "S614", in Line 2, delete "MME" and insert -- MME) --, therefor.

In the Specification

In Column 1, Line 8, delete "2017," and insert -- 2017, now Pat. No. 10,039,036, --, therefor.

In Column 7, Line 33, delete "EPPROM," and insert -- EEPROM, --, therefor.

In Column 7, Line 42, delete "medium" and insert -- medium. --, therefor.

In Column 9, Line 36, delete "S313" and insert -- S314 --, therefor.

In Column 10, Line 38, delete "EPPROM," and insert -- EEPROM, --, therefor.

In Column 11, Line 2, delete "S313" and insert -- S313. --, therefor.

In Column 11, Line 42, delete "EPPROM," and insert -- EEPROM, --, therefor.

In Column 12, Line 58, delete "example, The" and insert -- example, the --, therefor.

Signed and Sealed this
Thirty-first Day of December, 2019

Andrei Iancu
*Director of the United States Patent and Trademark Office*